J. WAUTERS.
SELF PLAYING VIOLIN.
APPLICATION FILED AUG. 1, 1908.

1,018,384.

Patented Feb. 20, 1912.

J. WAUTERS.
SELF PLAYING VIOLIN.
APPLICATION FILED AUG. 1, 1908.

1,018,384.

Patented Feb. 20, 1912.
7 SHEETS—SHEET 3.

J. WAUTERS.
SELF PLAYING VIOLIN.
APPLICATION FILED AUG. 1, 1908.

1,018,384.

Patented Feb. 20, 1912.
7 SHEETS—SHEET 5.

UNITED STATES PATENT OFFICE.

JOSEPH WAUTERS, OF BINGHAMTON, NEW YORK, ASSIGNOR TO THE RUDOLPH WURLITZER MANUFACTURING COMPANY, OF NORTH TONAWANDA, NEW YORK, A CORPORATION OF NEW YORK.

SELF-PLAYING VIOLIN.

1,018,384.     Specification of Letters Patent.     Patented Feb. 20, 1912.

Application filed August 1, 1908. Serial No. 446,397.

*To all whom it may concern:*

Be it known that I, JOSEPH WAUTERS, a subject of the King of Belgium, residing at Binghamton, in the county of Broome and State of New York, have invented certain new and useful Improvements in Self-Playing Violins, of which the following is a specification.

The invention relates to mechanically played musical instruments, and more particularly to instruments of the violin class.

An important object of the invention is to provide simple and compact fingering mechanism arranged to act directly upon the violin strings and capable of performing the required functions in relation thereto.

Another object of importance is to provide improved bowing mechanism which shall act on the strings with delicacy and feeling.

Other objects of the invention are provisions for improved and simply connected tuning means, devices for automatically producing the variations in force indicated by the term "expression", means for producing tremolo, or "shake" effects, an improved music-sheet and connections therefrom through the tracker-board, means for varying the time, improved driving mechanism for the apparatus, and, generally to provide mechanically operated means whereby the musical effects produced by skilful hand playing are successfully imitated.

The invention consists in certain novel features, and details of construction and arrangement by which the above objects are attained, to be hereinafter described.

The accompanying drawings form a part of this specification and show the invention as it has been carried out in practice.

Similar letters of reference indicate the same parts in all the figures.

A is the lower portion of a vertical casing containing a motor B driving the shaft $B^1$ of a pneumatic pump $B^2$ by which air is exhausted and a partial vacuum maintained in a main reservoir $B^3$ connected by pipes through a secondary reservoir $B^4$ to the several pneumatics by which the desired movements are initiated or controlled through connecting tubes from the tracker-board $B^5$, the apertures of which are controlled by perforations in the music-sheet $B^6$ arranged to register with such apertures as the sheet is fed across the tracker-board. The pneumatics may be understood to be of any ordinary or approved construction adapted for this class of service.

On the front of the upper portion $A^1$ of the casing is a vertical sounding-board $A^2$ to which the violin M is secured by adjustable clamps $A^3$. In rear of the sounding-board are various mechanical devices by which the several movements are produced, operated from a main shaft C extending from front to rear at one side, and driven through a belt or chain $C^1$ by the pump-shaft $B^1$.

The strings of the violin are vibrated by "bows" D, one for each string, constructed mainly as shown in a patent to me dated March 12, 1907, No. 846,883, and each comprising a curved lever swinging horizontally on a pivot or fulcrum at $d$ behind the sounding-board, and projecting through an opening $a$ in the latter. The bows are arranged in two pairs, one pair on each side of the body of the violin, and each carries in its outer end a vibrator-disk $D^1$, preferably of glass, rotated by a narrow belt $D^2$ running on idlers $D^3$ between the two plates forming the bow or lever, from a pulley on a shaft in the inner end of the lever, carrying a friction-disk $D^4$, to a pulley $D^5$ on the shaft $D^6$ of the vibrator-disk $D^1$. Motion is imparted to the friction-disks $D^4$ through a train of connections from the main-shaft C. On the rear end of the latter is a friction-plate $C^2$ against the rear face of which lies the periphery of a friction-wheel $C^4$ on a laterally extending horizontal shaft $C^3$ mounted to slide axially in its bearings to move the point of contact of the friction-wheel nearer to or farther from the axial line of the shaft C for varying the speed of the shaft $C^3$ as will be described.

$C^5$ is a sleeve splined on the shaft $C^3$ to revolve therewith but permit the latter to slide therethrough. It is held in fixed position by a wheel $C^6$ thereon having a V-groove in its periphery in which is engaged a fixed fork or yoke $A^4$ secured to the floor $A^5$ of the upper portion of the casing. The sleeve $C^5$ carries a pulley $C^7$ on which runs a twisted belt $C^8$ through which motion is transferred to a pulley $E^1$ on a vertical shaft E mounted in a step below and bearing above formed on a vertical bracket or standard $A^6$. Above the pulley $E^1$ are two pulleys $E^2$ $E^3$ on which run horizontal belts $E^4$ $E^5$ respectively to corresponding pulleys $F^2$ $F^3$ on vertical shafts F $F^1$ each of which carries friction wheels $F^4$ $F^4$ in the same planes with the friction-disks $D^4$ $D^4$ and adapted to rotate them when the latter are brought into contact with such friction-wheels by the swing of the bow-levers. The levers are thus swung by cords $D^7$ attached to the inner ends of the levers and running over idle leading pulleys $D^8$ to pneumatics $D^9$ operated through tubes and connecting devices from the tracker-board $B^5$ as will be described. Springs $D^{10}$ joining opposite pairs of levers tend to return the levers and hold the friction-disks $D^4$ $D^4$ out of contact with the wheels $F^4$ $F^4$ when the strings vibrated by the respective bows are to be silent. The levers are so proportioned and hung as to present the yielding friction-disks $D^4$ to their friction-wheels $F^4$ a little in advance of contact with the strings, thus insuring proper rotary motion to the vibrator-disks at such contact. Adjustment for this purpose is afforded by mounting the pivots $d$ $d$ in plates $A^7$ secured to the framing $A^8$ by screws extending through slots $a^1$ in such plates and permitting the latter to be swung pivotally by wires $D^{11}$ $D^{11}$ extending from the forward ends of the plates through the sides of the case $A^1$ and receiving nuts $D^{12}$ on their projecting threaded ends. The nuts are grooved peripherally and held by the engagement of fixed collars $A^9$ in such grooves, so that by turning the nuts the plates and connected levers are moved laterally. Similar wires $D^{13}$ extending rearwardly through the back of the casing $A^1$ receive similar nuts $D^{14}$ by which the plates may be adjusted toward the front or rear as required.

Figures 3, 8, 9, 10:
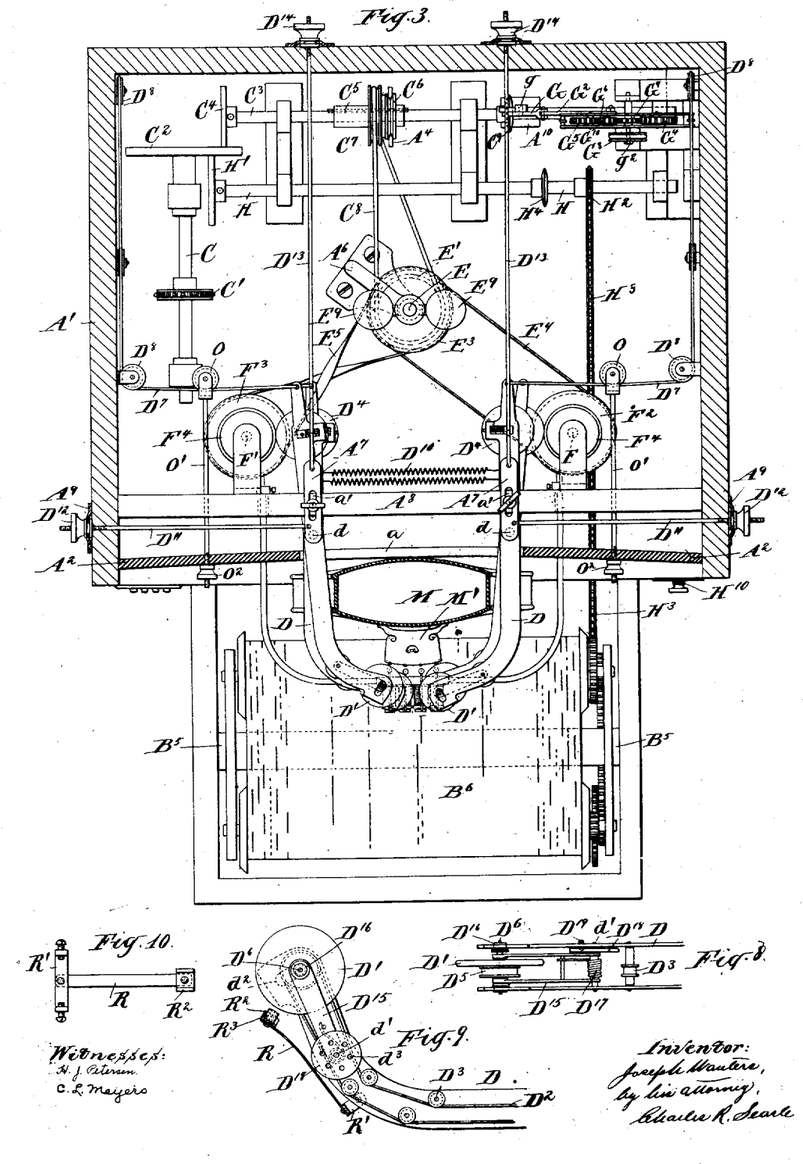
Fig. 3 is a horizontal section, partly in plan view, showing the driving mechanism.
Fig. 8 is an elevation of a portion of one of the bows.
Fig. 9 is a corresponding plan view with one of the side plates of the bow-lever removed, and partly in horizontal section.
Fig. 10 is an elevation showing an attachment for supplying resin.
Figures 4, 11, 12, 13:
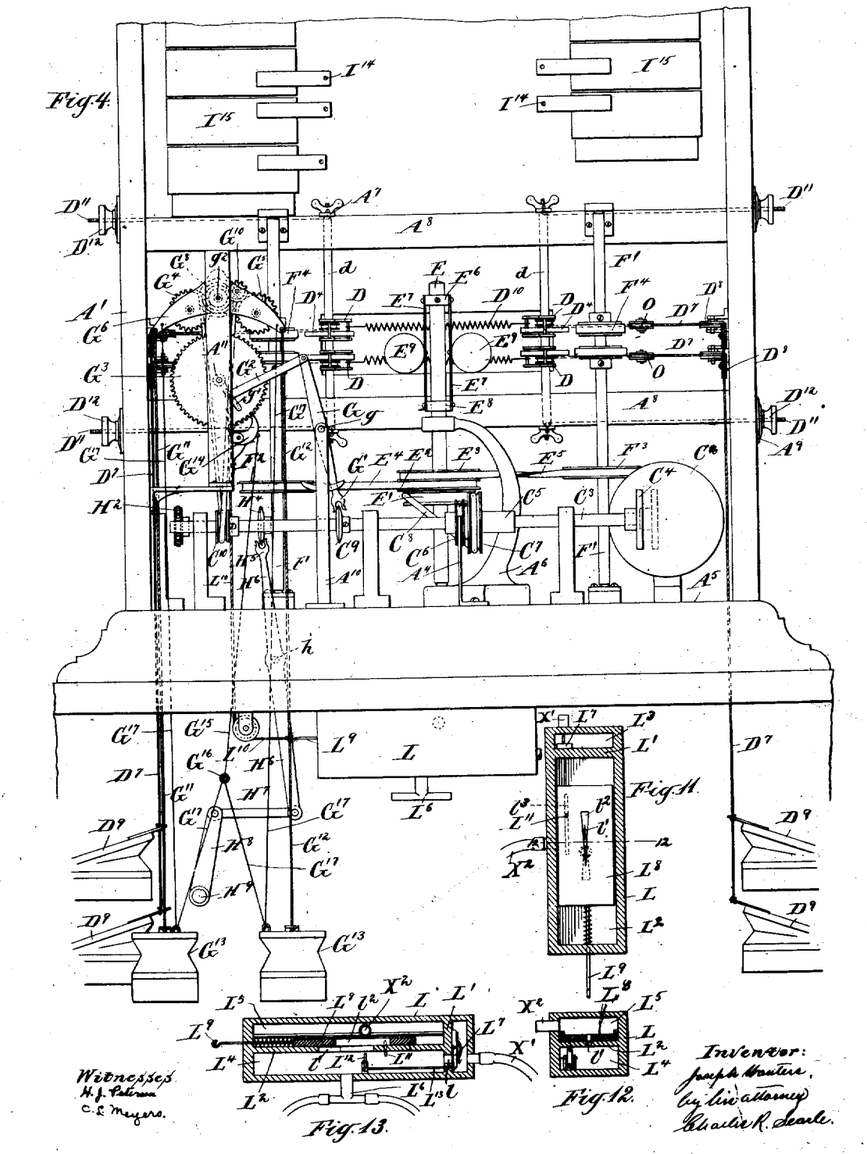
Fig. 4 is a corresponding rear elevation.
Fig. 11 is a horizontal section through the expression device.
Fig. 12 is a transverse section of the same, taken on the line 12—12 in Fig. 11.
Fig. 13 is a vertical longitudinal section of the same parts.

It is important that the contact of the vibrator-disk and string be exceedingly delicate and that the greater pressure due to further movement of the lever be capable of nice adjustment. This is effected by mounting the shaft $D^6$ of the vibrator-disk in a swinging frame $D^{15}$ pivoted at $d^1$ in the lever and limited in the extent of its swing by curved slots $d^2$ $d^2$ receiving flanged anti-friction rollers $D^{16}$ in which the shaft $D^6$ is journaled. A spring $D^{17}$ on the frame exerts its force in the direction to hold the vibrator-disk toward the string, and the tension of the spring is adjusted by turning a button $D^{18}$ to which one end of the spring is attached, in the direction to tighten or relax the spring. The button is held in the desired position by the engagement of the point of a screw $D^{19}$ in the lever with one of the depressions or recesses $d^3$ in the adjacent face of the button, as shown in Figs. 8 and 9.

As it is preferable that the vibrator-disks on one side of the violin revolve in an opposite direction to those on the other side, the shafts F and $F^1$ are rotated in opposite directions by employing the open belt $E^4$ on the pulleys $E^2$ and $F^2$ for the shaft F, and the crossed belt $E^5$ on the pulleys $E^3$ and $F^3$ for the other shaft.

The sliding-shaft $C^3$ is automatically moved to vary its rate of revolution by a vertically mounted shifting lever G fulcrumed at $g$ on a standard $A^{10}$ and having a fork $G^1$ at the lower end in which rotates a collar $C^9$ on the shaft; the upper end of the shifting lever is connected by a link $G^2$ to a crank arm or pin adjustably mounted in a radial slot $g^1$ in a gear-wheel $G^3$ which is rotated in either direction by the engagement therewith of the teeth on oppositely rotated pinions $G^4$ $G^5$ carried in a tilting yoke or frame $G^6$ pivoted at $g^2$ in a vertical bracket $A^{11}$. Motion is imparted to the pinions by a belt running on a pulley $C^{10}$ on the shaft $C^3$ and a pulley $G^8$ on the yoke $G^6$ above. Mounted on the same shaft as the pulley $G^8$ is a gear-wheel $G^9$ in mesh on one side with the pinion $G^4$ and on the other with an intermediate gear $G^{10}$ meshing with the other pinion $G^5$ on the other side and serving to rotate it in the opposite direction. From the ends of the frame $G^6$ extend cords $G^{11}$ and $G^{12}$ each connected to a pneumatic $G^{13}$ operated by a tube from the tracker-board. Normally the frame $G^6$ occupies a middle position with both pinions $G^4$ and $G^5$ out of mesh with the gear-wheel $G^3$, and the shaft $C^3$ tends to maintain a uniform rate in whatever position its friction-wheel happens to be relatively to the friction-plate, but a pull on the cord from one of the pneumatics tilts the frame and throws the corresponding pinion into mesh causing the gear-wheel to make a partial revolution and, through the link $G^2$ and lever G, shift the shaft $C^3$ to a new position and induce a corresponding change in velocity of its rotation and similarly increase or diminish the speed of the vibrator disks $D^1$.

H is a shaft extending transversely of the casing parallel with the shaft $C^3$ and arranged like the latter to slide axially in its bearings. It carries a friction-wheel $H^1$ at one end in contact with the front face of the friction-plate $C^2$ on the main shaft C and serves in driving the feeding and re-winding mechanism for the music-sheet $B^6$, which mechanism is only partially represented but may be understood to be of the usual or any approved construction. A sprocket wheel $H^2$ on the shaft H through a sprocket chain $H^3$ drives the music-sheet mechanism, and a collar $H^4$ on the same shaft is engaged by a fork $H^5$ on a lever $H^6$ fulcrumed at $h$ whereby the shaft may be moved axially to vary the speed through a link $H^7$ to an arm $H^8$ on a rock-shaft $H^9$ extending forwardly through the casing A and carrying on its projecting end an index finger $H^{10}$ by which the rock-shaft may be partially rotated to accelerate or retard the speed of the music-sheet and thus vary the time. The index finger is provided with a scale $H^{11}$ and designating marks and words, as "Moderato," "Allegro," and "Vivace" to aid in locating the index to produce the required rate.

Figure 5:
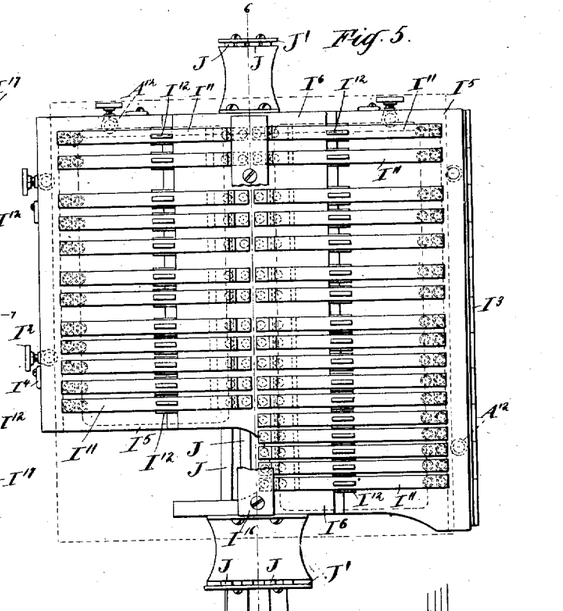
Fig. 5 is a front elevation showing the fingering means.
Figure 6:
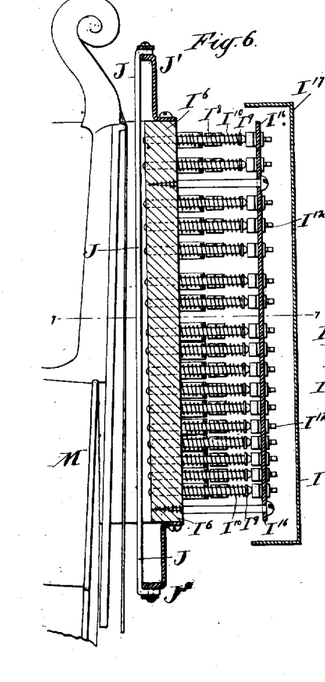
Fig. 6 is a vertical section of the same portion of the instrument, taken on the line 6—6 in Fig. 5.
Figure 7:
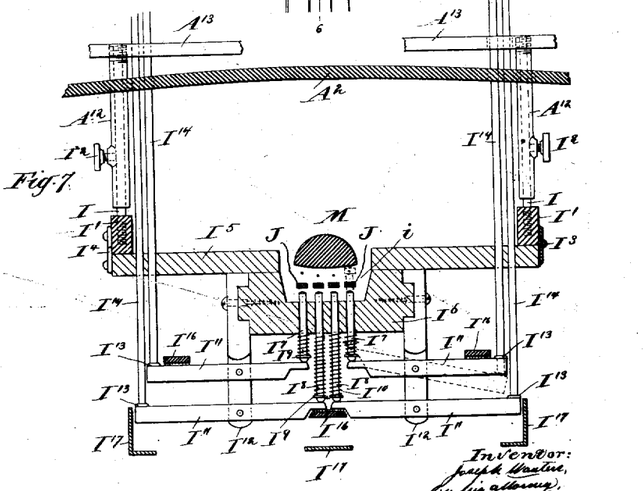
Fig. 7 is a corresponding horizontal section on the line 7—7 in Fig. 6.

The fingering mechanism is supported on tubular studs $A^{12}$ $A^{12}$ extending through openings in the sounding-board and firmly fixed in a portion of the framing $A^{13}$ in rear thereof. In the hollow studs are received rods I I secured at the forward ends in a frame $I^1$, and held in the desired forward or rearward position relatively to the violin by screws $I^2$ $I^2$ extending through bosses on the studs and impinging against the inclosed rods. Hinged at $I^3$ to the frame $I^1$ and secured thereto by hooks $I^4$ or other fastenings is a vertically arranged board $I^5$ having a projecting central ridge $I^6$ on the front and corresponding vertical channel $i$ at the rear in which the finger-board of the violin is partially inclosed as shown in Figs. 5, 6 and 7. Through the face of the ridge $I^6$ extend four series of sliding pins or fingers $I^7$ $I^8$ $I^7$ $I^8$ arranged in vertical rows, one for each string. The fingers $I^8$ of the inner rows are longer and project farther forward than those of the outer rows $I^7$ and all are equipped with collars $I^9$ and helical springs $I^{10}$ abutting at one end against the collars and at the other against face of the ridge and serving to hold the fingers normally away from the violin strings. The fingers are depressed to close the strings by four series of levers $I^{11}$ arranged in two banks on each side, fulcrumed on studs $I^{12}$ projecting from the board $I^5$ with their inner ends in position to strike the heads of the fingers. On the outer ends of the levers are sockets $I^{13}$ in which are received the ends of thrust-rods $I^{14}$ extending through the board and connected to arms on the pneumatics $I^{15}$ in rear of the latter, by which the rods are thrust forward to oscillate the levers $I^{11}$ and depress the fingers $I^7$ $I^8$ and thus engage the strings of the violin at the proper points as selected by the music-sheet and tracker-board, from which latter extend tubes to the pneumatics $I^{15}$. The fingers are so spaced in the board $I^5$ as to produce the required tones and half-tones of each string.

By loosening the screws $I^2$ the frame $I^1$ and its board may be moved forward sufficiently to free the thrust-rods $I^{14}$ from the board which latter may then be swung on its hinge to permit the removal and introduction of the violin, and access thereto for inspection or repairs, such as the renewal of the strings. The inner series of levers $I^{11}$ are shorter than the outer and lie immediately behind them but sufficiently separated therefrom to permit free operation of either without interference with the other. This arrangement allows the fingers to be properly arranged with the required compactness to produce the tones and half-tones in the limited space offered by the violin finger-board, and to be easily and directly operated by the pneumatics $I^{15}$.

$I^{16}$ are strips or bars faced with felt and serving as stops to receive the levers noiselessly as the latter are returned to their positions of rest, and $I^{17}$ is an openwork plate of metal inclosing the levers and serving as an ornamental face for the fingering mechanism, it is supported by studs, not shown, from the board $I^5$.

In order to close the strings with the same soft yielding qualities offered by the human finger tips, I interpose between each string and its series of fingers, a strip of soft vulcanized rubber J extending parallel with but out of contact with the string; the finger when forced down contacts first with the rubber strip and presses the latter against the string, the effect being closely analogous to that produced by the finger tips. The strips are held in clamps $J^1$ and $J^1$ secured to the upper and lower edges of the strip $I^{16}$ and are held under slight tension. Slurring is produced by depressing the fingers in series in rapid succession, the tone due to the depression of one finger flowing smoothly into that induced by the next, by reason of the action of the soft rubber strip.

The violin M is of the usual type and the mechanism is designed to play any such instrument of standard size, thus permitting a favorite violin to be placed in position and played without alteration or damage, and tuned while in place by turning the pegs with which it is equipped, the head of the violin being easily accessible for that purpose.

Figure 14:
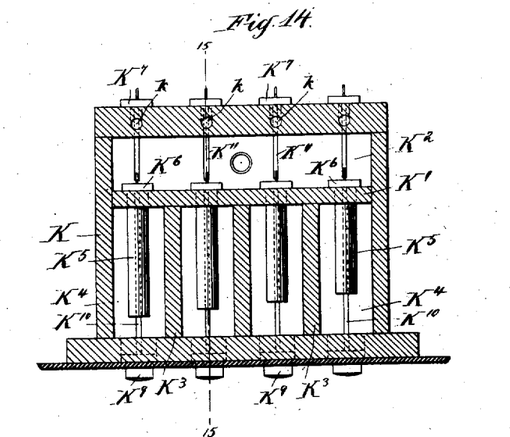
Fig. 14 is a horizontal section through the tuning device, the plane of section being indicated by the line 14—14 in the succeeding figure.
Figure 15:
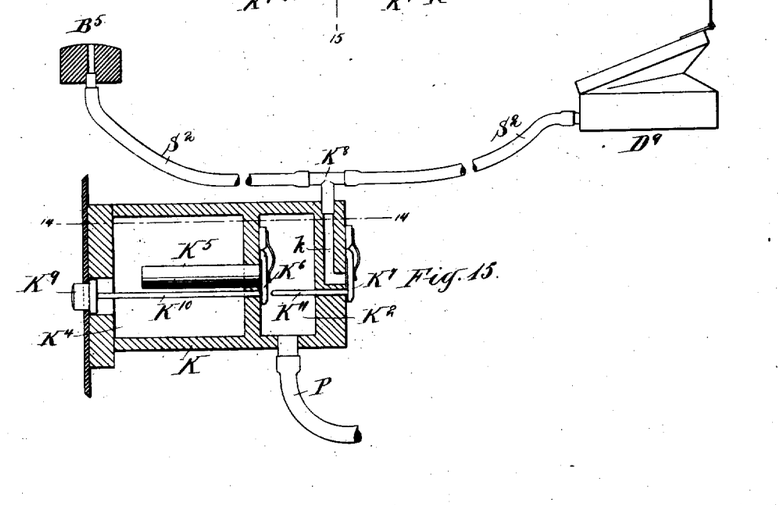
Fig. 15 is a vertical section partly in diagrammatic elevation, showing the tuning device and its connections, the plane of section being the line 15—15 in Fig. 14.

To aid in tuning I employ the device illustrated in detail in Figs. 14 and 15.

Figure 1:
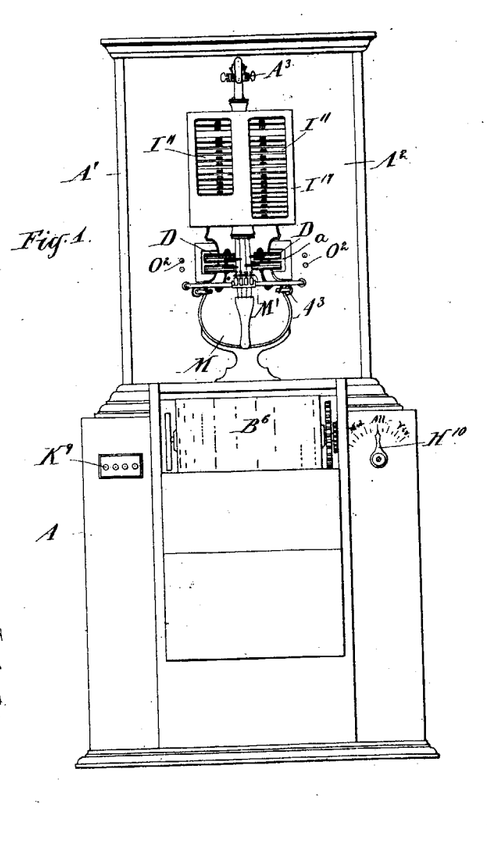
Figure 1 is a front elevation of the instrument with the music-roll or sheet exposed.
Figure 2:
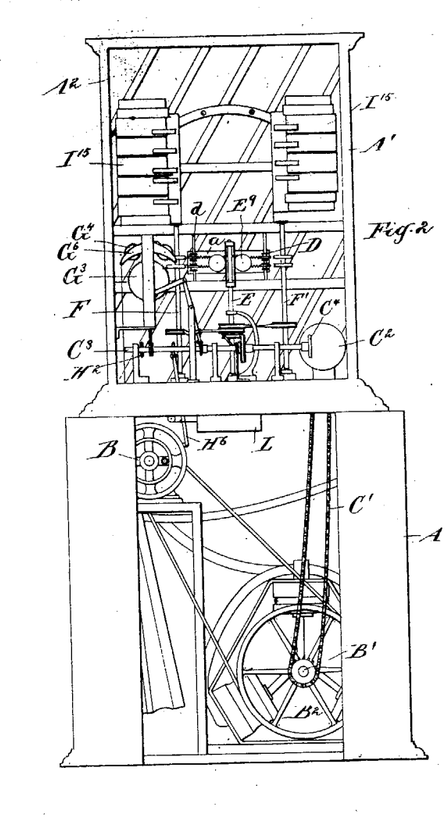
Fig. 2 is a corresponding back view with portions of the case removed to show the mechanism. The remaining figures are on larger and varying scales showing portions of the mechanism and certain details.

K is a box divided by a longitudinal partition $K^1$ into a single closed compartment $K^2$ on one side and by the additional transverse partitions $K^3$ $K^3$ into four cells $K^4$ $K^4$ on the other; in each of the cells is a reed or pitchpipe $K^5$, one for each string, conditioned to emit the note corresponding to its string at the desired pitch. Each pitchpipe is closed by a valve $K^6$ in the common compartment $K^2$ from which air is exhausted through a pipe P leading to the reservoir, and in the rear wall of the box are L-shaped passages $k$ $k$ each extending to the top of such wall and opening on its rear face where it is normally closed by an air-valve $K^7$; at the top of the wall each passage receives a T $K^8$ from one branch of which a tube extends to the bow-pneumatic $D^9$ and from the other a tube to the bow-operating aperture in the tracker-board $B^5$. A push-button $K^9$ for each pitchpipe is exposed on the front of the casing A at a convenient point, as shown in Fig. 1, from which extends a rod or wire $K^{10}$ through the partition $K^1$ to its valve $K^6$, and immediately behind the reed-valve but slightly separated therefrom is a similar rod or wire $K^{11}$ extending through the rear wall of the box and in contact with the air-valve $K^7$. Pressure upon one of the buttons opens the valve and causes its pitchpipe to sound; further movement of the button causes the valve to act upon the wire $K^{11}$ and open the corresponding air valve $K^7$, admitting air to the bow-pneumatic $D^9$ and through the latter actuating its vibrator disk upon the corresponding string and causing it to sound; if the tones emitted by the pitchpipe and string are not in unison the string is tightened or loosened until the desired coincidence is attained. When the push-button is released the valves again close and the impulses from the tracker-board to the bow-pneumatic produced by the music-sheet pass unobstructedly through the branches of the T $K^8$ and are unaffected by the tuning device.

The expression device consists of a rectangular chest L, Figs. 4, 11, 12 and 13, having a transverse partition $L^1$ at one end and a horizontal deck or partition $L^2$ extending therefrom and dividing the interior of the chest into three compartments $L^3$, $L^4$ and $L^5$; the end compartment $L^3$ is connected by a pipe $X^1$ to the reservoir, the lower compartment $L^4$ by a T-connection $L^6$ and exhaust pipes to the bow-pneumatics, and the upper compartment $L^5$ by a pipe $X^2$ to the reservoir. An opening $l$ in the partition $L^1$ controlled by a valve $L^7$ affords communication under certain circumstances to be explained, from the lower compartment $L^4$ to the end compartment $L^3$. The deck $L^2$ has an attenuated longitudinally extending triangular opening $l^1$ therethrough and is provided with a close fitting slide $L^8$ having a similar but reversed opening $l^2$ therein and moved longitudinally of the deck, in opposition to a spring, by a wire $L^9$ extending through the end of the chest and connected by a cord $L^{10}$ to a pin on the gear-wheel $G^3$ of the speed controlling mechanism above described. A long slot $l^3$ in the deck receives a pin $L^{11}$ projecting downwardly therethrough from the slide and protruding sufficiently to strike at one end of the slide-movement against the upper arm of a vertical lever $L^{12}$ mounted in the lower compartment $L^4$; the lower arm of the lever is connected to a thrust-rod $L^{13}$ arranged to open the valve $L^7$. $M^1$ is the bridge. $N^4$ are pneumatics adapted to be controlled by the music sheet for tremolo purposes when desired. The operation of this portion of the apparatus will be explained further on in this description.

A regulator on the upper end of the shaft E performs a function similar to that of a fly-wheel in opposing sudden changes of speed and absorbing shocks in the driving mechanism, but is constructed to allow changes of speed, as is required in mechanism of this character, to take place with greater rapidity than is allowed by a fly-wheel. It consists of a collar $E^6$ fixed on the shaft, connected by flat springs $E^7$ to a sleeve $E^8$ free to slide vertically on the shaft as the springs are expanded and straightened, and balls or weights $E^9$ attached one to each spring at about the mid-length of the latter. The revolutions of the shaft cause the balls to separate by centrifugal force and revolve with the shaft at a distance from the axial line thereof, and as their speed of travel increases with the distance from such axis their inertia aided by the resistance offered by the air tends to resist further acceleration, while their momentum tends to maintain the rate. This sensitive quality is of importance in mechanism of this character in which a balance is required which shall allow more rapid changes than are afforded by the usual fly-wheel.

O O are tightening pulleys carried on the inner ends of rods $O^1$ $O^1$ serving to take up any slack in the cords $D^7$ and $D^7$ by which the bow-levers are moved; they are operated by nuts $O^2$ $O^2$ bearing against the sounding-board, on the projecting screw-threaded ends of the rods at each side of the opening $a$.

Resin is applied to the peripheries of the vibrator-disks by an attachment shown in Figs. 9 and 10 and consisting of a flat spring R having at one end a clamp $R^1$ by which it is held on the bow-lever D, and at the other a pair of jaws $R^2$ in which a small block of resin $R^3$ is received. The resin is presented with light yielding force to the periphery of the vibrator-disk, when the latter is forced outwardly by contact with its string, the tension of the spring being adjusted by varying the position in which its clamp is fastened to the bow-lever.

Figure 16:
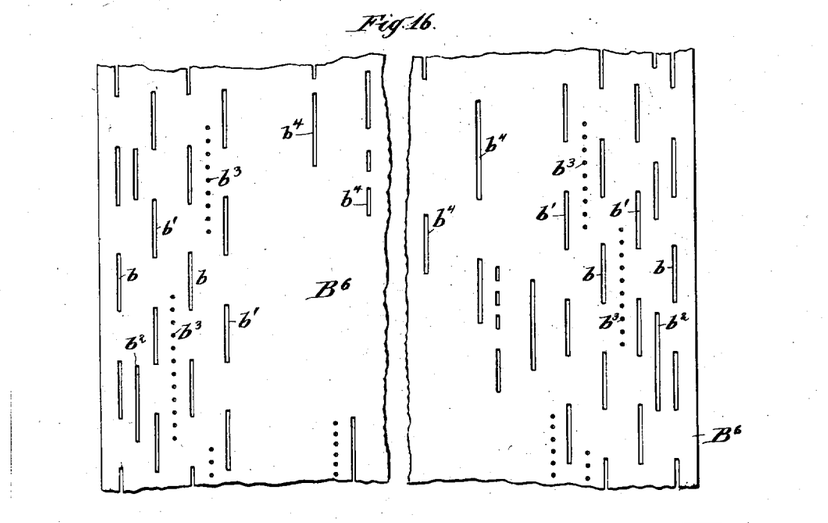
Fig. 16 is a face view of a portion of the music-sheet or roll.
Figure 17:
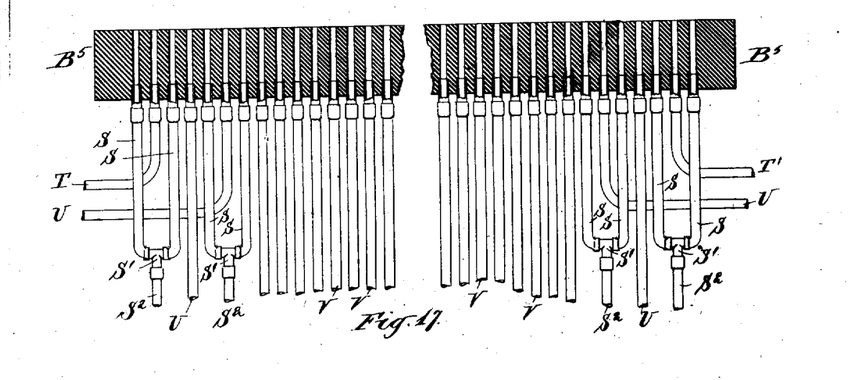
Fig. 17 is a longitudinal vertical section, partly in elevation, showing a portion of the tracker-board and its connected tubes.

It is sometimes necessary for one or more of the bows to be held in contact with its string for considerable continuous periods, which in the usual methods of perforation would require long slits in the music-sheet, tending to weaken the latter and render it unmanageable by the feeding mechanism; to overcome this difficulty and permit continuous contact of the vibrator-disks without weakening the sheet, the arrangement illustrated in Fig. 16 and 17 is introduced. Each vibrator-disk is represented by two openings in the tracker-board $B^5$ from which extend tubes S S joined below to the branches of a T $S^1$ from the stem of which extends a single bow-controlling tube $S^2$; and the sheet $B^6$ is formed with two rows of perforations $b$, $b^1$ each matching to one of such apertures. These perforations may be individually of moderate length so arranged that the perforation $b^1$ will open its tracker-board aperture at the instant, or a little before, the perforation $b$ of the other series has closed its aperture, thus supplying air to the tube $S^2$ continuously through the tubes S S alternately. To further strengthen the sheet the series of perforations $b$ $b^1$ are not formed side by side but are separated by a line of perforations controlling other devices or portions of the playing mechanism. As shown in Fig. 16 the outer perforations $b$ $b$ on each margin of the sheet lead to a bow aperture, the next series $b^2$ $b^2$ control the soft and loud expression devices through the tubes T and $T^1$ respectively; the next inner series on each side are the bow perforations $b^1$ $b^1$ for the same bows, the next $b^3$ $b^3$ control the tremolo devices for two strings through tubes U U, the next $b$ $b$ control one of the next pair of bow apertures, separated by another tremolo series $b^3$ $b^3$ from the other bow series $b^1$ $b^1$, the remaining rows $b^4$ $b^4$ in the sheet operate the fingering devices through tubes V V from the tracker-board.

Figure 18:
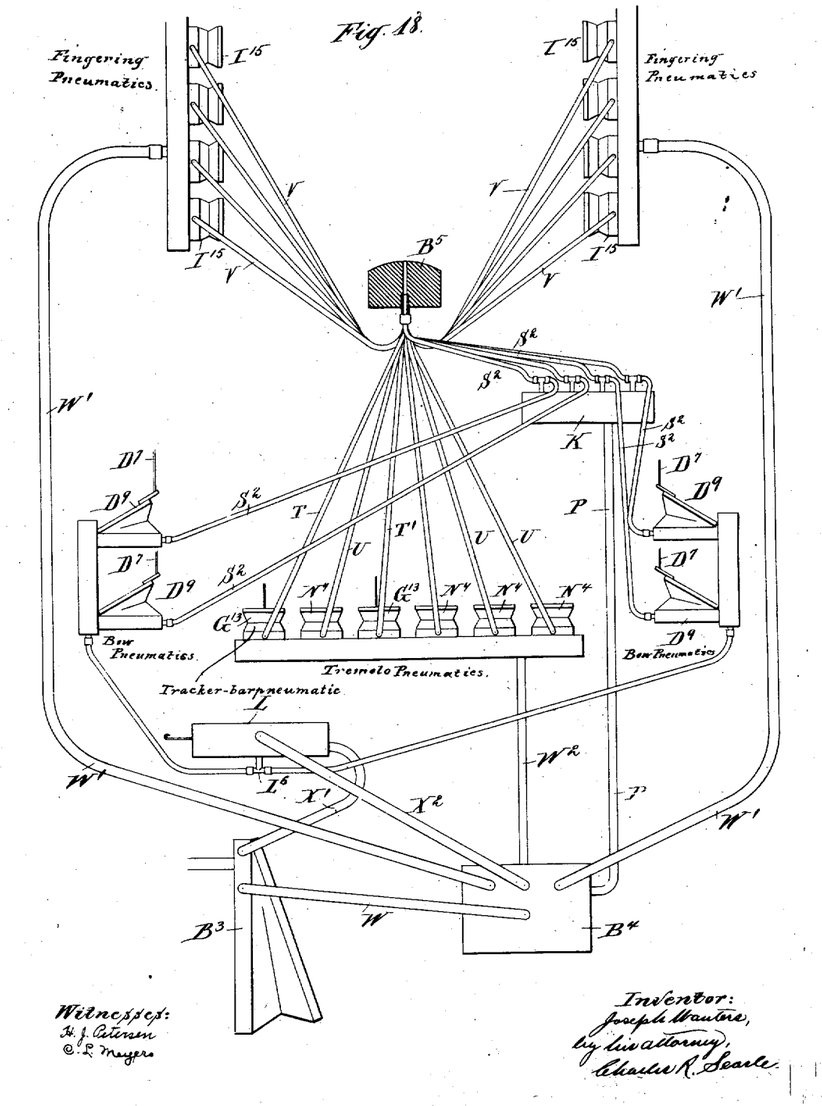
Fig. 18 is a diagram showing the arrangement of the pneumatic connections for actuating the several mechanisms.

In the diagram Fig. 18 the connections from the tracker-board are illustrated. The pump-reservoir $B^3$ is connected by a pipe W to the secondary reservoir $B^4$ in both of which a partial vacuum is maintained by the pump; from the secondary reservoir suction pipes $W^1$ $W^1$ lead to the fingering pneumatics $I^{15}$ which are actuated through the tubes V V from the tracker-board. The expression pneumatics $G^{15}$ $G^{15}$ are actuated through the tracker-board tubes T $T^1$ and the tremolo pneumatics $N^4$ through the tubes U U; a pipe $W^2$ to the secondary reservoir exhausts from these. The air connections from the tracker-board to the bow pneumatics $D^9$ is through the tuning device K, the tubes $S^2$ $S^2$ lead to the T's on the tuning-box and thence to the pneumatics, the passage being in effect continuous except when the push buttons $K^9$ are operated and open the valves $K^6$ to sound the pitchpipes. From the pneumatics $D^9$ the exhaust is through the expression-chest L by the pipes $X^1$ and $X^2$ leading therefrom to the pump or main reservoir $B^3$ and secondary reservoir $B^4$ respectively.

The force with which the disks $D^1$ will be presented to the strings is controlled by the triangular openings in the slide $L^8$ and deck $L^2$. The movement of the slide relatively to the deck varies the size of the opening, short movements producing comparatively great variations by reason of the shapes of the openings, and, through the connection $L^{10}$ to the speed regulating mechanism, is arranged to be lessened when the speed is lessened and increased when the speed is increased. This automatically varies the pressure of the disks against the strings and also varying their rate of revolution, causing them to press lightly and revolve slowly in the soft passages of the music and to press strongly and revolve rapidly in the loud passages. The formation of a slight opening retards the transmission of air pressure from the lower compartment $L^4$ to the upper $L^5$ and induces light contact between the disks and strings, but a movement of the slide $L^8$ to enlarge the opening permits rapid equalization of pressure and the disks are presented with corresponding force. A still further movement of the slide to produce full opening raises the valve $L^7$ in the end compartment $L^3$, through the action of the pin $L^{11}$ and lever $L^{12}$, and affords direct communication through the pipe $X^1$ to the pump reservoir in addition to that already established through the pipe $X^2$ to the secondary reservoir and presents the disks with full pressure against the strings, producing the loud strong tones required in sudden forte passages.

A pipe P from the secondary reservoir to the tuning box maintains the desired partial vacuum therein and a pipe $W^2$ from the tremolo and speed controlling pneumatics performs a similar function for these parts.

$G^{14}$ is a spring pawl engaging the teeth of the gear-wheel $G^3$ and serving to prevent its movement when not rotated by one or the other of the pinions $G^4$ $G^5$. It is withdrawn to release the gear-wheel by a cord $G^{15}$ attached thereto and to a ring $G^{16}$; to the latter are also attached the ends of cords $G^{17}$ $G^{17}$ running through eyes $G^{18}$ on the pneumatics $G^{13}$ and thence to the ends of the yoke $G^6$ where they are fastened. The collapse of either of the pneumatics $G^{13}$ pulls its cord $G^{17}$ and swings the yoke, at the same time releasing the gear-wheel by withdrawing the pawl $G^{14}$. This arrangement may be used instead of the direct acting cords $G^{12}$ or may be used in conjunction with the latter as shown.

It will be noted that all the operations including the modulations of speed and force under the term "expression" are performed automatically through the music-sheet.

The bowing devices are constructed to provide the desired delicate contact with the strings and are automatically actuated.

The arrangement of the fingering mechanism permits practically direct action from the pneumatics to the finger-board.

The rubber strips supply the required soft but firm touch required, and the fingering mechanism is compact and simple in construction and operation and may be easily swung aside to permit access to the violin.

The mechanism for varying the tempo is easily operated and noiseless, and the tuning devices are simple and are introduced in the bowing system in such manner as to be always ready for service without interference with such system or requiring any movement of valve or controlling devices other than those actuated by the push-buttons.

The construction and arrangement do not require a specially designed instrument; any violin of standard size may be played, and the tones are not muffled by mechanism inclosing or touching the violin; all playing parts forward of the sounding-board are supported by the main framing independently of such board, thus permitting the latter to carry the violin alone and respond to its vibrations.

Modifications may be made in the forms, proportions and arrangements of the several devices within wide limits without departing from the principle of the invention, and parts may be used without the whole.

Although the apparatus is shown and described as operating in conjunction with a violin, it will be understood that any instrument of the violin type may be performed upon, or parts of the invention may be employed for mechanically playing upon instruments of other types or for other purposes.

Parts herein shown and described but not claimed are to be made the subject matter of separate applications, one of which is already filed under Serial No. 621,201.

I claim:—

1. In an instrument of the violin type, a string, means for varying the length of the note-producing portion of the string, and a strip of material extending longitudinally of said string between the latter and said string-varying means.

2. In an instrument of the violin type, a string, fingering means therefor, and a strip of resilient material extending longitudinally of said string between the latter and said fingering means.

3. In a violin player, a string, a fingerboard, fingering means constructed to close said string against said finger-board at various points in its length, and a strip of rubber extending longitudinally of said string between the latter and said fingering means.

4. In a violin player, a violin, fingering means for the strings thereof, and strips of resilient material extended longitudinally of said strings between the latter and said fingering means.

5. In a violin player, a violin, fingering means consisting of a series of pins for each string thereof and means for pressing said pins against said strings, and strips of rubber extended longitudinally of said strings between the latter and said pins.

6. In a violin player, a violin, a series of fingers for each string thereof, a series of pivotally mounted levers for actuating said fingers, a series of pneumatics, and means actuated from said pneumatics and loosely engaging said levers for moving the latter.

7. In a violin player, a violin, a series of fingering pins for each string thereof, the pins for the inner strings longer than those for the outer strings, a series of pivotally-mounted levers contacting with each series of pins, the levers for said long pins longer than the levers for the short pins, said levers being separate from said pins, a series of pneumatics for each series of levers, and thrust-rods from said pneumatics to said levers.

8. In a violin player, a violin, a fingering device comprising a plurality of pins and levers for each string of said violin, and supports for said fingering device, said supports being slidably mounted for movement in a direction parallel with the length of the pins whereby the fingering device may be adjusted relatively to the strings and means for detachably mounting said fingering device whereby it may be removed when desired.

9. In a violin player, a violin, a sounding-board on which said violin is mounted, a frame in rear of said sounding-board and out of contact therewith, a fingering device, sliding supports for said fingering device extending from said frame through said sounding-board, and means for varying the lengths of said supports to adjust said fingering device relatively to the strings of said violin.

10. In a violin player, a support for a violin, a frame inclosing the finger-board thereof, a board hinged to said frame and carrying a fingering device, operating rods for said fingering device extending through said board, and sliding supports for said frame, whereby said frame, board and fingering device may be moved on said sliding supports to free said rods from said board and permit the latter to be swung on its hinge and permit access to said violin.

11. In a violin player, a sounding-board, a violin mounted thereon, a frame inclosing the finger-board of said violin, a board hinged to said frame and carrying a fingering device, operating rods for said fingering device extending through openings in said sounding-board, a fixed support in rear of said sounding-board and out of contact therewith, and tubular studs and rods arranged to slide telescopically one within the other extending from said fixed support to said frame and carrying the latter.

12. In a violin player, a fingering device comprising a series of fingers for each string of said violin, a series of levers for actuating said fingers, a board supporting said fingering device, a clamp at each end of said board, and a series of strips of rubber extended longitudinally of the said violin strings between the latter and said fingers and held by said clamps.

In testimony that I claim the invention above set forth I affix my signature, in presence of two witnesses.

JOSEPH WAUTERS.

Witnesses:
  NINA WATROUS,
  HARRY C. WALKER.